United States Patent [19]

Bachmann et al.

[11] 4,152,484

[45] May 1, 1979

[54] MAGNETIC RECORDING MEDIA

[75] Inventors: Rudolf Bachmann, Frankenthal; Hans-Joerg Hartmann, Freinsheim; Herbert Motz, Ludwigshafen, all of Fed. Rep. of Germany

[73] Assignee: BASF Aktiengesellschaft, Fed. Rep. of Germany

[21] Appl. No.: 819,820

[22] Filed: Jul. 28, 1977

Related U.S. Application Data

[63] Continuation of Ser. No. 415,415, Nov. 13, 1973, abandoned.

[30] Foreign Application Priority Data

Nov. 15, 1972 [DE] Fed. Rep. of Germany ....... 2255802

[51] Int. Cl.$^2$ ............................................. H01F 10/02
[52] U.S. Cl. .................................. 428/425; 428/522; 428/539; 428/900
[58] Field of Search ............................... 427/127–132; 428/522, 539, 900, 425

[56] References Cited

U.S. PATENT DOCUMENTS

| | | | |
|---|---|---|---|
| 3,649,541 | 3/1972 | Ingersoll | 117/235 |
| 3,690,946 | 9/1972 | Hartmann et al. | 117/235 |

*Primary Examiner*—Bernard D. Pianalto
*Attorney, Agent, or Firm*—Keil & Witherspoon

[57] ABSTRACT

This invention relates to magnetic recording media comprising a non-magnetic base and a magnetic coating firmly bonded thereto, which coating consists essentially of a dispersion of a finely divided magnetic pigment in a polyurethane-containing mixture of binders. This binder mixture contains from 30 to 90% by weight of an elastomeric polyurethane which is virtually free from isocyanate groups and is soluble in a volatile organic solvent, and from 10 to 70% by weight of a vinyl chloride copolymer containing from 5 to 50% by weight of polymerized units of a monoester obtained from an aliphatic diol of from 2 to 4 carbon atoms and acrylic or methacrylic acid. Magnetic recording media having a magnetic coating containing this binder mixture are distinguished by advantageous mechanical and electrical properties, in particular by good abrasion resistance and improved packing density combined with better orientation of the magnetic particles.

6 Claims, No Drawings

MAGNETIC RECORDING MEDIA

This is a continuation of application Ser. No. 415,415, filed Nov. 13, 1973 and now abandoned.

The present invention relates to a magnetic recording medium consisting of a non-magnetic base and a magnetic coating applied thereto and based on a finely divided magnetic pigment dispersed in binder, which magnetic coating contains a binder mixture consisting of a polyurethane and a hydroxyl-containing vinyl chloride copolymer.

In new developments in the field of magnetic recording media attempts are made to improve the mechanical properties of the magnetic layer, namely flexibility, elasticity, tensile strength and abrasion resistance, and also to improve the quality of the recording by achieving a higher magnetic pigment loading in the binder and improved orientation of the magnetic particles in the recording direction. Thus a particularly suitable binder or binder mixture for magnetic recording media is characterized by the said advantageous mechanical properties and also, in particular, by the ability to allow the magnetic particles dispersed therein to attain a very high degree of orientation in the direction of web travel when passed through a magnetic field immediately after the coating operation. One requirement for achieving this is that the binders must be capable of thoroughly wetting the magnetic particles used.

It is known to manufacture heavy-duty magnetic recording media with dispersions of magnetic pigments in binders based on polyurethane elastomers or blends of polyurethane elastomers with other polymeric binders as the magnetic layer. Polyurethanes such as are described for example in German Printed Application No. 1,106,959 or polyether urethanes as described in U.S. Pat. No. 2,899,411, when used alone as the binder, have the disadvantage that they do not impart sufficient hardness to the surface of the magnetic coating. Various publications have therefore proposed combining these polyurethanes with other binders to improve the surface hardness of the magnetic coating. German Printed Application No. 1,269,661 describes the use of a mixture of polyurethanes with polyesters for the manufacture of magnetic recording media. However, this combination does not bring about a substantial improvement in the surface hardness, and may result in adjacent layers of tape in the pack sticking together under conditions of elevated temperature and pressure. German Printed Application No. 1,295,011 discloses the modification of polyurethanes by blending the same with higher molecular weight phenoxy resins such as are sold for example by Union Carbide Corporation under the name of phenoxy resin PKHH. Such blends show satisfactory mechanical properties up to temperatures of about 65° C., but the use of the phenoxy resin has a detrimental effect on the orientatability of the acicular magnetic particles in their preferred direction of orientation in the magnetic field. It is also known to blend vinyl chloride copolymers with polyurethanes to produce binders. Vinyl chloride copolymers show satisfactory mechanical properties and promote the orientatability of the magnetic particles in the magnetic field. U.S. Pat. No. 3,144,352 describes the addition of vinyl chloride/acrylonitrile copolymers to polyurethanes, but the relatively low thermal stability of the resulting products is a disadvantage (cf. German Published Application No. 2,037,605). The combination of polyurethanes with vinyl chloride/vinyl acetate copolymers is described in German Printed Application No. 1,282,700, but such combinations do not provide the mechanical properties required at elevated temperature. Blending of polyester urethanes with polycarbonates, as proposed in German Published Application No. 2,114,611, has the disadvantage of producing a high-viscosity solution of said binder mixture. It is generally required of components added to the polyurethane binders used in a magnetic coating that they improve the surface hardness of the magnetic coating without impairing its excellent tensile strength and break elongation values or the orientatability of the magnetic particles. None of the prior art additives meets this requirement in a satisfactory manner.

We have found that the aforementioned disadvantages and deficiencies of the prior art binder mixtures of polyurethanes and additives may be substantially avoided if the additive used is a vinyl chloride copolymer containing at least 50% by weight of polymerized units of vinyl chloride and from 5 to 50% by weight of polymerized units of a monoacrylate or monomethacrylate of an aliphatic diol of from 2 to 4 carbon atoms. Although these vinyl chloride copolymers, when used alone, give brittle and hard films, blending thereof with polyurethanes surprisingly gives excellent tensile strength and break elongation values which are in some cases even higher than the very high values already measured on unblended polyurethanes. Another unexpected result is the reduced thermoplasticity shown by such polymer mixtures.

Accordingly, the present invention relates to magnetic recording media comprising a non-magnetic base and a magnetic coating firmly bonded thereto and consisting essentially of a dispersion of particulate magnetic pigments in a polyurethane-containing binder mixture showing good abrasion resistance and improved mechanical and magnetic properties, particularly a higher orientation ratio and packing density in the magnetic layer, which magnetic recording media are characterized in that the binder mixture contains from 30 to 90% by weight of an elastomeric polyurethane which is virtually free from isocyanate groups, is soluble in a volatile organic solvent and is derived from a linear aliphatic polyester or polyether and a diisocyanate of from 6 to 24 carbon atoms, and from 10 to 70% by weight of a vinyl chloride copolymer containing at least 50% by weight of polymerized units of vinyl chloride and from 5 to 50% by weight of polymerized units of a monoester of an aliphatic diol of from 2 to 4 carbon atoms with acrylic or methacrylic acid.

Particularly advantageous magnetic recording media are those in which the polyurethane-containing binder mixture is a mixture of:

($A_1$) from 30 to 90%, preferably from 50 to 85%, by weight of an elastomeric, thermoplastic polyester urethane which is virtually free from isocyanate groups and is derived from an aliphatic dicarboxylic acid of from 4 to 6 carbon atoms, an aliphatic diol of from 4 to 10 carbon atoms and a diisocyanate of from 6 to 24, particularly from 8 to 20, carbon atoms, or ($A_2$) from 30 to 90% by weight of a thermoplastic isocyanate-group-free polyether urethane such as is described in U.S. Pat. No. 2,899,411 and produced from an aliphatic polyether such as the polycondensate of an aliphatic diol of from 3 to 6 carbon atoms or the polymer of a cyclic ether of from 3 to 6 carbon atoms with a diisocyanate of from 8 to 12 carbon atoms, and (B) from 10 to 70% by weight of a copolymer of vinyl chloride containing from 50 to 95% by weight of polymerized units of vinyl chloride and from 5 to 50% by weight of polymerized units of a monoacrylate or monomethacrylate of an aliphatic diol of 2 to 4 carbon atoms, preferably containing from 70 to 90% by weight of polymerized units of vinyl chloride and from 10 to 30% by weight of polymerized units of a monoacrylate or monomethacrylate of an aliphatic diol of from 2 to 4 carbon atoms.

We have also found that magnetic recording media of the above type having very good properties may be obtained by effecting cross-linking of the binder mixture by adding a relatively small amount, preferably from 1 to 15% by weight, based on the weight of binder, of polyisocyanate during or after mixing with the finely divided magnetic pigment.

The elastomeric and virtually isocyanate-group-free polyurethanes obtained from a linear aliphatic polyester or polyether and a polyisocyanate, which are soluble in a volatile organic solvent and which are to be used in the magnetic coating of the invention as one component of the binder mixture, are known per se and some of them are commercially available (cf. Saunders-Frisch, Polyurethanes, Chemistry and Technology, Part II, Chapter IX, New York 1964 and the references cited therein).

The soluble, thermoplastic and virtually isocyanate-group-free polyester urethanes mentioned above as being particularly suitable for use in the binder mixtures of the invention are also known per se and are similar to those obtainable by the method proposed in German Printed Application No. 1,106,959. They are linear polyester urethanes prepared by reacting a polyester derived from an aliphatic dicarboxylic acid of from 4 to 6 carbon atoms, such as adipic acid, and at least one aliphatic diol of from 3 to 10 carbon atoms, such as propylene glycol, 1,4-butanediol, diethylene glycol, 1,6-hexanediol, neopentyl glycol and octanediol, with a diisocyanate having from 6 to 24, particularly from 8 to 20, carbon atoms, such as toluylene diisocyanate, diphenylmethane-4,4'-diisocyanate and m-xylylene diisocyanate, preferably in the presence of a glycol of from 4 to 10 carbon atoms, e.g. 1,4-butanediol, which increases the length of the chain. Suitable polyester urethanes have a tensile strength of approx. 300 to 650 kg/cm$^2$ and an elongation at break of from about 300 to 700%.

The polyether urethanes contained in the binder mixture of the invention may be prepared, in particular, by the method proposed in U.S. Pat. No. 2,899,411. They are manufactured by reacting a polyether based on an aliphatic glycol of from 3 to 6 carbon atoms and having a molecular weight of from 800 to 4,000 with a diisocyanate having from 8 to 20 carbon atoms, e.g. toluylene diisocyanate and diphenylmethane-4,4'-diisocyanate, in the presence of a glycol of from 4 to 12 carbon atoms, which lengthens the chain. Suitable polyether urethanes have a tensile strength of from about 300 to 650 kg/cm$^2$ and an elongation at break of from 400 to 700%.

Vinyl chloride/diol mono-(meth)arcylate copolymers which are suitable for blending with the polyurethanes may be made in a conventional manner by solution copolymerization or suspension copolymerization of vinyl chloride and the diol mono-(meth)acrylate. The diol monoacrylate or monomethacrylate used in this case is an esterification product of acrylic or methacrylic acid with the equivalent molar amount of aliphatic diol of from 2 to 4 carbon atoms, for example ethylene glycol, 1,4-butanediol and, preferably, propanediol, which propanediol is preferably 1,3-propanediol or a mixture of 1,3-propanediol with up to 50% by weight of 1,2-propanediol. The copolymers advantageously have a vinyl chloride content of from 50 to 95% by weight and a diol acrylate or methacrylate content of from 5 to 50% by weight. Particularly suitable copolymers preferably have a content of from 70 to 90% by weight of vinyl chloride and from 10 to 30% by weight of diol monoacrylate or monomethacrylate. A 15% solution of a particularly suitable copolymer such as a vinyl chloride/propanediol monoacrylate copolymer in a mixture of equal parts by volume of tetrahydrofuran and dioxane has a viscosity of about 30 centipoises at 20° C. The K values of the particularly suitable products, measured according to H. Fikentscher, "Cellulosechemie", 30, 58 et seq (1932), are between 30 and 50 and preferably about 40.

It is a special advantage of the mixture of the invention that the excellent pigment-binding property of the binder mixture permits high concentrations of magnetic pigment in the magnetic coatings without impairing their mechanical properties. Since the viscosity of the binder mixture of the invention is low compared with other polyurethane combinations, the magnetic pigment dispersions made therewith are particularly easy to process industrially.

The mechanical properties of the magnetic layers produced in accordance with the present invention may be further improved, as regards abrasion resistance, whilst reducing the thermoplasticity, by adding further polyisocyanates, preferably di- or tri-isocyanates such as diphenylmethane-4,4'-diisocyanate or the reaction product of 3 moles of toluylene diisocyanate with 1 mole of 1,1,1-trimethylolpropane. The amount of polyisocyanates added is generally from about 1 to 15% by weight of the total weight of binder.

The preferred vinyl chloride/diol monoacrylate copolymers and polyurethanes which are used as binders in the present invention in the manufacture of magnetic pigment dispersions, which may be carried out in a conventional manner, are advantageously soluble in organic solvents such as tetrahydrofuran, dimethylformamide, dioxane or mixtures thereof or in mixtures of such solvents with ketones, esters and/or aromatic hydrocarbons such as methyl ethyl ketone, ethyl glycol acetate and benzene or toluene.

The magnetic layers may also have added to them, in known manner, small quantities of dispersing agents, fillers and lubricants during dispersion of the magnetic pigments or during manufacture of the magnetic coating. Examples of such additives are metal soaps such as salts of fatty acids or isomerized fatty acids and metals of groups I to IV of the Periodic Table, stearic acid, amphoteric electrolytes such as lecithins and fatty acid esters or waxes, silicone oils and carbon black. The amount of said additives is that usually employed and is generally below 10% by weight based on the magnetic coating.

Suitable magnetic pigments are those known per se, the properties of the finished magnetic coating being governed, inter alia, by the magnetic pigment used. Examples of magnetic pigments are γ-iron (III) oxide, particulate magnetite, ferromagnetic chromium dioxide, cobalt-modified γ-iron oxide and ferromagnetic metals and metal alloy pigments such as alloys of iron and cobalt (manufactured for example by the method of German Pat. No. 1,247,026). Acicular γ-iron(III) oxide is preferred as magnetic pigment. The particle size is generally from 0.2 to 2μ and preferably from 0.3 to 0.8μ.

The ratio of magnetic pigment to binder in the magnetic recording media of the invention is generally from 1:10, particularly 4 to 6:1. A particular advantage of the mixture of the invention is that due to its excellent pigment-binding power, high concentrations of magnetic pigment are possible in the magnetic coatings without their mechanical properties being impaired and their service characteristics suffering appreciably.

Conventional rigid or flexible base materials may be used as non-magnetic and non-magnetizable supports. Particularly suitable flexible bases are films of linear polyesters, e.g. polyethylene terephthalate, generally having a thickness of from 4 to 200μ, particularly from 10 to 36μ. Aluminum discs may for example be used as rigid non-magnetizable bases. More recently, the use of magnetic coatings on paper bases has become important for electronic computing and accounting machines; the coating materials of the invention may also be used with advantage for this purpose, too.

Preparation of the magnetic coatings may be carried out in a conventional manner. The magnetic dispersion prepared from the magnetic pigment and the binder solution in the presence of dispersing agents and other additives in dispersing apparatus, e.g. a tube mill or a stirred ball mill, is advantageously filtered and applied to the non-magnetizable base using conventional coating equipment, e.g. a knife coater. Usually, orientation of the magnetic particles is effected before the fluid mix has dried on the base, drying being advantageously carried out for from 2 to 5 minutes at temperatures of from 50° to 90° C. If binder mixtures are used to which polyisocyanates have been added, there is no need, in contrast to some known polyisocyanate binders, to subject the coated material to a heat treatment after coating, i.e. one which goes beyond normal physical drying, e.g. curing.

The magnetic coatings may be subjected to a conventional surface treatment, e.g. calendering in which the coated material is passed between polished rollers, with the optional application of pressure and optional heating at temperatures of from 50° to 100° C., preferably from 60° to 80° C. Following this treatment the thickness of the magnetic coating is generally from 3 to 20μ and preferably from 8 to 15μ. In the case of the production of flexible magnetic tapes, the coated webs are slit in the longitudinal direction to the usual widths.

The magnetic recording media of the invention are distinguished by excellent mechanical properties. In particular, the unusually good orientatability of the magnetic particles should be emphasized.

The invention is further illustrated by the following Examples and Comparative Experiments in which parts and percentages are by weight unless otherwise stated.

EXAMPLE 1

A tube mill is charged with 40,000 parts of steel balls having diameters of from 4 to 6 mm and then with the following mixture: 3,500 parts of acicular γ-iron(III) oxide, 2,135 parts of a mixture of equal parts of tetrahydrofuran and dioxane, 87.5 parts of lecithin, 17.5 parts of polydimethyl siloxane and 1,050 parts of a 20% solution of a copolymer containing 83% of vinyl chloride units and 17% of propanediol monoacrylate units in a mixture of equal parts of tetrahydrofuran and dioxane.

This mixture is dispersed for 24 hours and then 4,000 parts of a 12.5% solution of a thermoplastic polyester urethane of adipic acid, 1,4-butanediol and diphenylmethane-4,4'-diisocyanate in a mixture of equal parts of tetrahydrofuran and dioxane are added. Dispersion is continued for a further 25 hours, following which the resulting magnetic dispersion is filtered under pressure through a filter having a pore width of 5μ and applied to a polyethylene terephthalate film using a knife coater. Drying is effected at a temperature of from 60° to 100° C. after the coated material has been passed through a magnetic field. After drying, the magnetic coating has a thickness of 5μ. The coated material is calendered by passing it between heated rollers (80° C.) at a nip pressure of about 3 kg/cm and then slit into tapes of the usual widths, e.g. 6.25 mm and 3.81 mm for audio tapes. The resulting tapes exhibit excellent frictional characteristics and good abrasion resistance. The magnetic properties and volumetric packing density are given in Table 1 below.

COMPARATIVE EXPERIMENT A

The procedure of Example 1 is followed except that the copolymer of vinyl chloride and propanediol monoacrylate is replaced by a partially hydrolyzed copolymer of vinyl chloride and vinyl acetate as described in U.S. Pat. No. 2,512,723, the ratio of vinyl chloride to vinyl acetate to vinyl alcohol units in this copolymer being 91:6:3, by weight. The magnetic properties and volumetric packing density of the magnetic coatings of the resulting tapes are given in Table 1.

COMPARATIVE EXPERIMENT B

The procedure of Example 1 is followed except that the copolymer of vinyl chloride and propanediol monoacrylate is replaced by a copolymer containing 87% of vinyl chloride units and 13% of vinyl acetate units, as described in U.S. Pat. Nos. 1,935,577 and 2,052,658. The magnetic properties and volumetric packing density of the magnetic coatings of the resulting magnetic tapes are given in Table 1.

COMPARATIVE EXPERIMENT C

The procedure of Example 1 is followed except that the copolymer of vinyl chloride and propanediol monoacrylate is replaced by a phenoxy resin as described in German Printed application No. 1,295,011 as component for blending with polyurethanes. The magnetic properties and volumetric packing density of the magnetic coatings of the resulting magnetic tapes are given in Table 1.

COMPARATIVE EXPERIMENT D

The procedure of Example 1 is followed except that the copolymer of vinyl chloride and propanediol monoacrylate is replaced by a polycarbonate such as is described in German Published application No. 2,144,611 as component for blending with polyurethanes. The magnetic properties and volumetric packing density of the magnetic coatings of the resulting magnetic tapes are given in Table 1.

EXAMPLE 2

The procedure of Example 1 is followed except that the dispersion is mixed with 2 parts of a reaction product of 1 mole of 1,1,1-trimethylolpropane and 3 moles of toluylene diisocyanate, based on 100 parts of the solid binder mixture, before said dispersion is applied to the plastics base material. The magnetic properties and volumetric packing density of the magnetic coatings of the resulting magnetic tapes are given in Table 1.

TABLE 1

Magnetic properties and volumetric packing densities of the magnetic coatings of the magnetic tapes produced according to Examples 1 to 2 and Comparative Experiments A to D:

|  | Magnetic properties in recording direction | | Orientation ratio | Volumetric packing density $(g/cm^3)$ |
|---|---|---|---|---|
|  | $H_c$ (oersteds) | $4\pi I_R$ (gauss) | | |
| Example 1 | 313 | 1320 | 2.02 | 2.15 |
| Comp. Experiment A | 308 | 1145 | 1.74 | 1.90 |
| Comp. Experiment B | 311 | 1180 | 1.75 | 1.92 |
| Comp. Experiment C | 311 | 1090 | 1.55 | 1.78 |
| Comp. Experiment D | 313 | 1210 | 1.78 | 1.84 |
| Example 2 | 309 | 1285 | 1.97 | 2.05 |

Table 1 compares the magnetic properties and packing densities of the magnetic coatings of the resulting magnetic tapes. The degree of saturation remanence has a considerable influence on the quality of the magnetic recording. The degree of saturation remanence also has a decisive effect on the signal-to-noise ratio and maximum output level in audo work and on the obtainable recording level in data processing and video work. Table 1 shows that the magnetic coatings which have been prepared using binder mixtures of the invention (Examples 1 and 2) show a remarkable increase in the saturation remanence on account of a higher volumetric packing density and a higher orientation ratio as compared with the magnetic coatings containing other binder combinations (Comparative Tests A to D). The orientation ratio is the ratio of the saturation remanence in the recording direction to the saturation remanence in the crosswise direction and is a measure of the orientatability of the magnetic particles. The volumetric packing density is defined as the weight of magnetizable material in grams per cm³ of coating. The magnetic properties were measured in a vibrating-sample magnetometer at a magnetic field strength of 1,300 oersteds.

EXAMPLE 3

7 parts of a polyester urethane manufactured according to German Printed Application No. 1,106,959 from adipic acid, 1,4-butanediol and diphenylmethane-4,4'-diisocyanate, and 3 parts of a copolymer containing 83% of vinyl chloride units and 17% of propanediol monoacrylate units are dissolved in 56 parts of a mixture of equal parts of tetrahydrofuran and dioxane. The viscosity of this solution is determined using a rotary viscometer (15% solution). The binder solution is applied to films of polyethylene with the aid of a knife coater to give dry coating thicknesses of from 40 to 50μ. The tensile strength and elongation at break are determined by the test method laid down in German Standard Specification DIN 53,455. The pendulum hardness is determined using a Koenig pendulum hardness tester as specified in DIN 53,157.

COMPARATIVE EXPERIMENT E

The procedure of Example 3 is followed except that the copolymer of vinyl chloride and propanediol monoacrylate is replaced by a partially hydrolyzed copolymer of vinyl chloride and vinyl acetate as described in U.S. Pat. No. 2,512,726, the ratio of vinyl chloride to vinyl acetate to vinyl alcohol units in this copolymer being 91:6:3, by weight.

COMPARATIVE EXPERIMENT F

The procedure of Example 3 is followed except that the copolymer of vinyl chloride and propanediol monoacrylate is replaced by a copolymer containing 87% of vinyl chloride units and 13% of vinyl acetate units as described in U.S. Pat. Nos. 1,935,577 and 2,052,658.

COMPARATIVE EXPERIMENT G

The procedure of Example 3 is followed except that the copolymer of vinyl chloride and propanediol monoacrylate is replaced by a phenoxy resin as described in German Printed Application No. 1,295,011 as component for blending with polyurethanes.

COMPARATIVE EXPERIMENT H

The procedure of Example 3 is followed except that the copolymer of vinyl chloride and propanediol monoacrylate is replaced by a polycarbonate such as is described in German Published Application No. 2,114,611 as component for blending with polyurethanes.

TABLE 2

Viscosity of solutions of blends prepared in Example 3 and Comparative Experiments E to H and properties of coatings made therewith:

|  | Viscosity (cp) 25° C. | Tensile strength $\delta_R$ (kg/cm²) | | Elongation at break $\epsilon_R$ (%) | | Pendulum Hardness | | Remarks |
|---|---|---|---|---|---|---|---|---|
|  |  | 20° C. | 50° C. | 20° C. | 50° C. | 20° C. | 50° C. |  |
| Example 3 | 394 | 714 | 685 | 482 | 738 | 29 | 25 |  |
| Comp. Exp. E | 598 | 565 | 475 | 313 | 840 | 22 | 16 | discoloration occurs |
| Comp. Exp. F | 491 | 643 | 556 | 466 | 784 | 23 | 18 | discoloration occurs |
| Comp. Exp. G | 452 | 628 | 556 | 320 | 633 | 28 | 16 |  |
| Comp. Exp. H | 924 | 473 | 396 | 317 | 700 | 34 | 24 |  |

EXAMPLE 4

7 parts of a polyether urethane, prepared in accordance with U.S. Pat. No. 2,899,411 from polyoxytetramethylene and diphenylmethane-4,4'-diisocyanate and 1,4-butanediol, and 3 parts of a copolymer containing 83% of vinyl chloride units and 17% of propanediol monoacrylate units are dissolved in 56 parts of a solvent consisting of equal parts of tetrahydrofuran and dioxane. The viscosity of the solution is determined using a rotary viscometer. The binder solution is applied to polyethylene films using a knife coater to give dry coating thicknesses of from 40 to 50μ. The coatings are then removed from the polyethylene films for the purpose of further testing. The tensile strength and elongation at break are measured according to DIN 53,455 and the pendulum hardness is determined using a Koenig pendulum hardness tester as specified in DIN 53,157.

COMPARATIVE EXPERIMENT J

The procedure of Example 4 is followed except that the copolymer of vinyl chloride and propanediol monoacrylate is replaced by a partially hydrolyzed copolymer of vinyl chloride and vinyl acetate, the ratio of vinyl chloride to vinyl acetate to vinyl alcohol units in this copolymer being 91:6:3, by weight.

COMPARATIVE EXPERIMENT K

The procedure of Example 4 is followed except that the copolymer of vinyl chloride and propanediol monoacrylate is replaced by a copolymer containing 87% of vinyl chloride units and 13% of vinyl acetate units.

COMPARATIVE EXPERIMENT L

The procedure of Example 4 is followed except that the copolymer of vinyl chloride and propanediol monoacrylate is replaced by a phenoxy resin such as is described in German Printed Application No. 1,295,011 as component for blending with polyurethanes.

COMPARATIVE EXPERIMENT M

The procedure of Example 4 is followed except that the copolymer of vinyl chloride and propanediol monoacrylate is replaced by a polycarbonate such as is described in German Published Application No. 2,114,611.

TABLE 3

Viscosity of solutions of blends produced in Example 4 and Comparative Experiments J to M and properties of the coatings made therewith:

|  | Viscosity (cp) | Tensile strength $\delta_R$ (kg/cm$^2$) | | Elongation at break $\epsilon_R$ (%) | | Pendulum Hardness | | Remarks |
| --- | --- | --- | --- | --- | --- | --- | --- | --- |
|  | 25° C. | 20° C. | 50° C. | 20° C. | 50° C. | 20° C. | 50° C. |  |
| Example 4 | 480 | 620 | 340 | 870 | 950 | 24 | 23 |  |
| Comp. Exp. J | 674 | 580 | 310 | 698 | 940 | 19 | 18 | discoloration occurs |
| Comp. Exp. K | 584 | 600 | 310 | 760 | 890 | 26 | 14 | discoloration occurs |
| Comp. Exp. L | 688 | 520 | 260 | 450 | 640 | 26 | 16 |  |
| Comp. Exp. M |  | incompatible |  |  |  |  |  |  |

Tables 2 and 3 compare tensile strengths, break elongations and pendulum hardnesses of the individual polymer coatings produced with mixtures of polyurethanes with various components in the ratio of 7:3. It is clear from these Tables that the mechanical properties of the mixtures used in the invention (Examples 3 and 4) are superior to those of the polymer mixtures used in Comparative Experiments E to M. In addition, the viscosity of the solutions of the blends used in the invention is very low, which has technological advantages. Thus, the blends of the invention can produce a dispersion having a higher solids content than can be obtained with the other blends, the rheological data being equal. If dispersions having the same solids content are produced, those prepared using the blends of the invention require less solvent.

The extent to which the values drop when measured at 50° C. may be regarded as a measure of the thermoplasticity of the system in question. A comparison of these values shows that the binder system of the invention exhibits the high values with regard to mechanical strength and surface hardness necessary for the preparation of magnetic recording media, and also exhibits low thermoplasticity. Whereas the coatings made in Comparative Experiments E and F and J and K yellow when stored for 10 days at 50° C. on account of low stability and the absence of added stabilizers, the coatings of the blends of the invention, which are also unstabilized, remain transparent, colorless and clear when stored for even longer periods at 50° C.

We claim:

1. Magnetic recording media having a non-magnetic base and, applied thereto, a firmly adhering magnetizable coating consisting essentially of a dispersion of finely divided magnetic pigments in a polyurethane-containing binder mixture, wherein the binder mixture contains from 30 to 90% by weight of an elastomeric polyurethane which is virtually free from isocyanate groups, is soluble in a volatile organic solvent and is derived from a linear aliphatic polyester or polyether and a diisocyanate having from 6 to 24 carbon atoms, and from 10 to 70% by weight of a vinyl chloride copolymer containing at least 50% by weight of polymerized units of vinyl chloride and from 5 to 50% by weight of polymerized units of a monoester of an aliphatic diol of from 2 to 4 carbon atoms with acrylic or methacrylic acid.

2. Magnetic recording media as set forth in claim 1, wherein the binder mixture of the magnetic coating contains from 50 to 85% by weight of polyurethane and from 15 to 50% by weight of said vinyl chloride copolymer.

3. Magnetic recording media as set forth in claim 1, wherein the polyurethane is an elastomeric polyester urethane obtained from adipic acid, 1,4-butanediol and diphenylmethane-4,4'-diisocyanate and having a tensile strength of from 300 to 650 kg/cm$^2$ and an elongation at break of from 300 to 700%.

4. Magnetic recording media as set forth in claim 1, wherein the polyurethane is an elastomeric polyether urethane obtained from polyoxytetramethylene, 1,4-butanediol and diphenylmethane-4,4'-diisocyanate and having a tensile strength of from 300 to 650 kg/cm$^2$ and an elongation at break of from 400 to 700%.

5. Magnetic recording media as set forth in claim 1, wherein a polyisocyanate in an amount of from 1 to 15% by weight of the weight of binder is added to the magnetic coatings before or during their manufacture.

6. Magnetic recording media as set forth in claim 1 wherein said vinyl chloride copolymer contains polymerized units of vinyl chloride and polymerized units of propanediol monoacrylate.

* * * * *